US011802586B2

(12) United States Patent
Leung

(10) Patent No.: US 11,802,586 B2
(45) Date of Patent: Oct. 31, 2023

(54) DEVICE FOR RELEASABLY RETAINING CARABINER

(71) Applicant: Chun Kau Leung, Kowloon (HK)

(72) Inventor: Chun Kau Leung, Lam Tin (HK)

(*) Notice: Subject to any disclaimer, the term of this patent is extended or adjusted under 35 U.S.C. 154(b) by 31 days.

(21) Appl. No.: 17/488,726

(22) Filed: Sep. 29, 2021

(65) Prior Publication Data

US 2023/0108201 A1    Apr. 6, 2023

(51) Int. Cl.
*F16B 45/02* (2006.01)
*A63B 29/02* (2006.01)

(52) U.S. Cl.
CPC .................. *F16B 45/021* (2021.05); *A63B 29/02* (2013.01)

(58) Field of Classification Search
CPC ................ A63B 29/02; F16B 45/021
See application file for complete search history.

(56) References Cited

U.S. PATENT DOCUMENTS

| | | | | |
|---|---|---|---|---|
| 6,510,599 | B2* | 1/2003 | AmRhein | F16B 45/021 248/925 |
| 7,571,944 | B2* | 8/2009 | Mortensen | A62B 99/00 248/925 |
| 8,398,134 | B1* | 3/2013 | Mortensen | B66F 19/00 294/191 |
| 11,235,202 | B2* | 2/2022 | Connell | A63B 29/02 |
| 2002/0148093 | A1* | 10/2002 | AmRhein | F16B 45/021 29/270 |
| 2005/0183904 | A1* | 8/2005 | Bacalso | A63B 29/08 182/5 |

FOREIGN PATENT DOCUMENTS

| | | | | |
|---|---|---|---|---|
| CN | 201431743 | Y * | 3/2010 | |
| CN | 102726163 | A * | 10/2012 | A45F 3/14 |
| CN | 206380830 | U * | 8/2017 | |
| CN | 207836956 | U * | 9/2018 | |
| EP | 3831450 | A1* | 6/2021 | A62B 35/0043 |
| WO | 2020058554 | A2* | 3/2020 | A63B 29/08 |

OTHER PUBLICATIONS

European Extended Search Report for corresponding EP22275011.9, dated Jul. 20, 2022, 21 pages.

* cited by examiner

*Primary Examiner* — Bayan Salone
(74) *Attorney, Agent, or Firm* — Tucker Ellis LLP; Michael G. Craig

(57) ABSTRACT

A device for releasably retaining a carabiner, said device includes: an elongate body with a jaw member hingedly attached at a first position thereto, said jaw member being movable towards and away from the elongate body in a first plane; a first projecting member and a second projecting member extending outwardly from a first side of the elongate body and away from the first plane; a third projecting member extending outwardly from a first side of the jaw member and away from the first plane, wherein the first projecting member and the second projecting member are configured to receive a spine of a carabiner inserted therebetween and whereupon third projecting member is configured to urge a gate of the carabiner toward the spine of the carabiner.

23 Claims, 18 Drawing Sheets

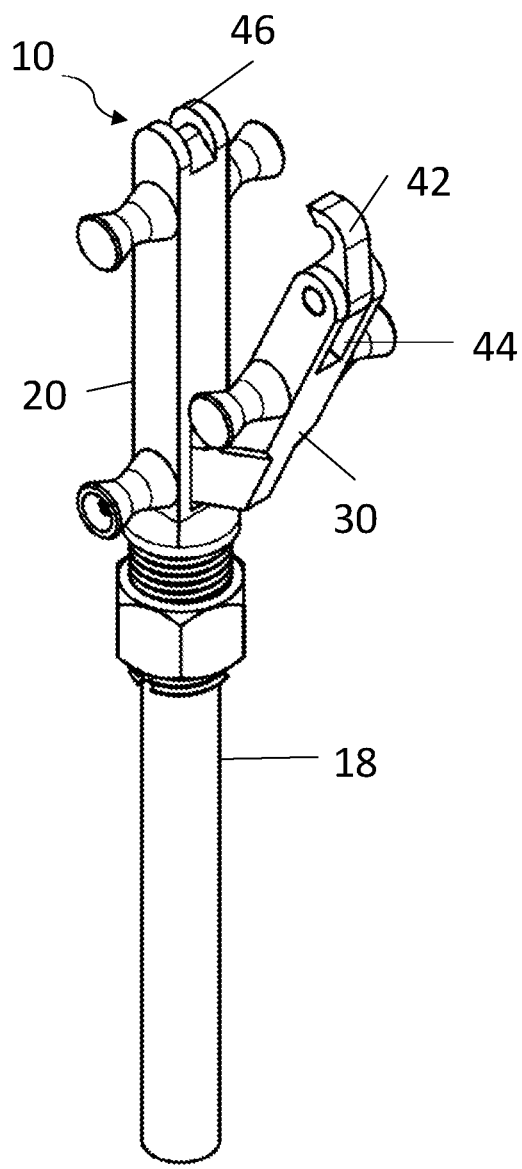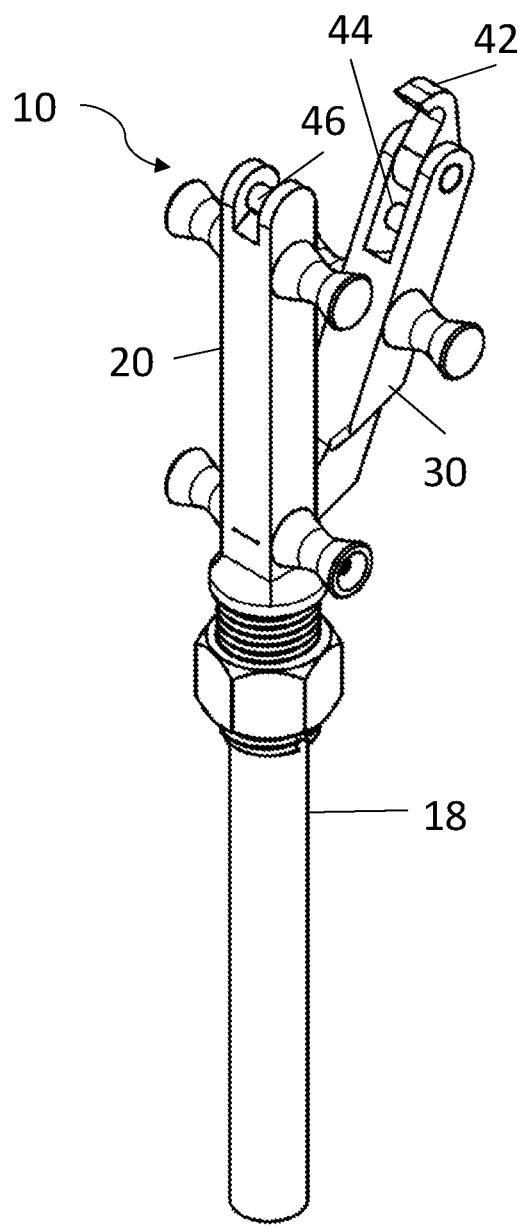
FIG. 7A
FIG. 7B

DEVICE FOR RELEASABLY RETAINING CARABINER

FIELD OF THE DISCLOSURE

The present disclosure relates to a device intended to be used with carabiners, and specifically to a device for releasably retaining carabiners.

BACKGROUND

Some rock climbers ("free climbers") rely on their own physical strength and skill to ascend a route. Other rock climbers ("sport climbers") use fixed anchors (such as bolts) fixed to the rock for protection; while "traditional climbers" use removable protection as they ascend the route.

As is known in the art, a sport climbing route may be defined by a series of bolts arranged to follow a "line" up a face. Sport climbers typically also use specialized metal "hangers" ("bolt hangers") which are affixed under the bolt with a tab projecting perpendicular to the face. A hole is formed in the tab of the bolt hanger for receiving a carabiner. Another type of bolt called glue-in bolt, in which the metal body is fixed by cured epoxy resin in the hole on wall, are also used commonly in climbing route.

Sport climbers typically clip a climbing rope attached to themselves into the bolt hangers/ hangers to safely arrest any inadvertent fall as they ascend a route. Typically, the attachment of the rope to an anchor is facilitated by using a quickdraw (also known as an extender), including two carabiners connected by an inextensible tape/similar. In these arrangements, one carabiner of the quickdraw connects with the hanger and the other carabiner receives the rope. Commonly, the rope is also attached to the climber and tensioned by a climbing partner, typically using a belay device, paying out or taking in rope as the climber ascends or descends.

Since the bolt hangers are usually spaced some distance apart (e.g. a couple of meters apart), which is beyond the climbers' reach, it is desirable to have a device which can assist in clipping into the next bolt hanger. This is especially important for the first bolt above the ground to avoid a "ground fall" or "decking".

Unfortunately, although such assistive devices are known, typically these devices are either improvised or may be deformed or broken easily, and are not easy to use. Accordingly, it is desirable to provide a device which addresses at least some of these problems and at least provides the public with an alternative.

It is therefore an object of the present disclosure to provide a device for releasably retaining carabiners which is robust and easy to use.

SUMMARY

Features and advantages of the disclosure will be set forth in the description which follows, and in part will be obvious from the description, or can be learned by practice of the herein disclosed principles. The features and advantages of the disclosure can be realized and obtained by the devices particularly pointed out in the appended claims.

In accordance with a first aspect of the present disclosure, there is provided a device for releasably retaining a carabiner, said device including:
- an elongate body with a jaw member hingedly attached at a first position thereto, said jaw member being movable towards and away from the elongate body in a first plane;
- a first projecting member and a second projecting member extending outwardly from a first side of the elongate body and away from the first plane;
- a third projecting member extending outwardly from a first side of the jaw member and away from the first plane,
- wherein the first projecting member and the second projecting member are configured to receive a spine of a carabiner inserted therebetween and whereupon third projecting member is configured to urge a gate of the carabiner toward the spine of the carabiner.

In another embodiment, the first projecting member, the second projecting member and the third projecting member extend outwardly and parallel relative to each other.

In another embodiment, the first projecting member, the second projecting member and the third projecting member extend outwardly and substantially orthogonal to the first plane.

In another embodiment, the third projecting member is disposed on a first side of the jaw member and between the first projecting member and the second projecting member when said jaw member is adjacent a longitudinal axis of the elongate body.

In another embodiment, the device further include a fourth projecting member extending outwardly and away from an opposed side to the first side of the elongate body or the first side of the jaw member.

In another embodiment, at least one of the first projecting member and the second projecting member on the first side of the elongate body, and the third projecting member on the first side of the jaw member, are disposed on the elongate body and jaw member respectively so as to receive a first part of a loop of a rope therebetween; and wherein the fourth projecting member on the opposed side of the elongate body or jaw member is configured to guide a second part of the loop of the rope thereon.

In another embodiment, the device further includes a fourth projecting member extending outwardly and away from an opposed side to the first side of the jaw member, and a fifth projecting member extending outwardly and away from an opposed side to the first side of the elongate body.

At least one of the first projecting member and the second projecting member on the first side of the elongate body and the third projecting member on the first side of the jaw member may be disposed on the elongate body and jaw member respectively so as to receive a first part of a loop of a rope therebetween; and wherein the fourth projecting member on the opposed side of the elongate body and the fifth projecting member on the opposed side of the jaw member are disposed on the elongate body and jaw member respectively so as to receive a second part of the loop of the rope therebetween.

The jaw member may be engageable with the elongate body so as to be substantially adjacent thereto.

The jaw member may be engageable with the elongate body by an engagement means being a complementary securing means, a substantially inextensible member, and fastening means.

Alternatively, the engagement mechanism is a pivotally attached hook disposed on the elongate body or jaw member engageable in a corresponding recess disposed on either of the elongate body or jaw member.

The engagement mechanism may also be a hook and loop fastener disposed on the elongate body and a third side of the jaw member.

The engagement mechanism may be a pair of magnetic members disposed on the elongate body and a third side of the jaw member.

The device may further include a sixth projecting member extending outwardly and away from an opposed side to the first side of the elongate body.

At least one of the first projecting member, second projecting member and third projecting member comprises a first tapered frusto-conical section attached to a second frusto-conical section, and the first frusto-conical section and the second frusto-conica section taper toward each other for guiding a rope thereabout.

At least one of the first projecting member, second projecting member and third projecting member comprise a reinforcing element engaged therein.

The metallic element may be a screw member threadingly engaged therewith. The device may further includes a base having an aperture for receiving an extension member therein.

The extension member may be secured within the aperture by a locking mechanism comprising an externally threaded portion and a corresponding nut engageable thereabout.

The extension member may be extendable or collapsible.

Optionally, at least one of the elongate body, jaw member, first projecting member, second projecting member and third projecting member is made of plastic.

In accordance with another aspect of the present disclosure, there is provided a method of operating the device of the present disclosure to secure a carabiner to a bolt anchor, the method including:
  inserting a spine of a carabiner between the first projecting member and the second projecting members;
  urging a gate of the carabiner toward the spine of the carabiner against the force of a biasing means for retention by the third projecting member; and
  advancing a nose of the carabiner through a void of a bolt anchor, and displacing the jaw member from retention by the third member for closure of the gate by said biasing means.

In accordance with another aspect of the present disclosure, there is provided a method of operating the device of the present disclosure to secure a rope loop within a remotely located carabiner, the method including:
  guiding a first part of the rope loop between at least one of the first projecting member and the second projecting member on the first side of the elongate body of the device, and the third projecting member on the first side of the jaw member of the device;
  guiding a second part of rope loop on the fourth projecting member on the opposed side of the elongate body or jaw member;
  engaging the loop of the rope in a remotely located carabiner.

The method may further include extracting the rope from between the least one of the first projecting member and the second projecting member on the first side of the elongate body of the device, and the third projecting member on the first side of the jaw member of the device.

Advantageously, the device of the present disclosure is robust and easy to use way of releasably retaining of carabiners . In a further embodiment of the present disclosure, the device may possess additional function of releasably retaining a rope.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

Preferred embodiments of the present disclosure will be explained in further detail below by way of examples and with reference to the accompanying drawings, in which:

FIG. 7A depicts a perspective view of the engagement mechanism of an embodiment of the device in an unengaged state according to the present disclosure, where the engagement mechanism is a pivotally attached hook.

FIG. 7B depicts another perspective view of the engagement mechanism of an embodiment of the device in an unengaged state according to the present disclosure, where the engagement mechanism is a pivotally attached hook.

DETAILED DESCRIPTION

Various embodiments of the disclosure are discussed in detail below. While specific embodiments are discussed, it should be understood that this is done for illustration purposes only. A person skilled in the relevant art will recognize that other components and configurations may be used without parting from the spirit and scope of the disclosure.

Embodiments of the present disclosure are detailed below with reference to the drawings. Throughout this description, the term "proximal" refers to the portion of the device or component thereof that is closer to the user and the term "distal" refers to the portion of the device or component thereof that is farther from the user.

It should be understood that the terms "bolt", "hanger", "bolt anchor" and "glue-in bolt" mentioned throughout the present disclosure are all within the definition of the term "bolt hanger".

Figure 1A:
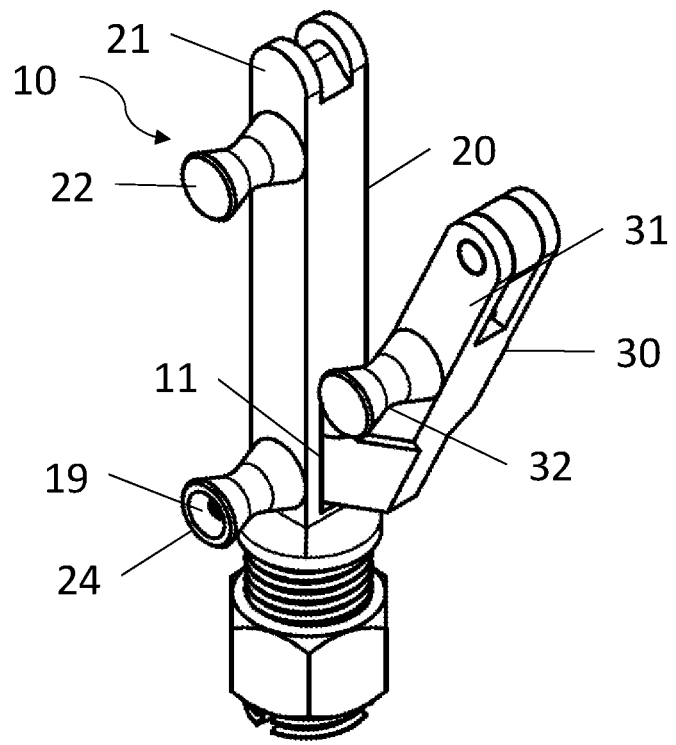
FIG. 1A depicts a perspective view of an embodiment of the device according to the present disclosure with three projecting members.
Figure 1B:
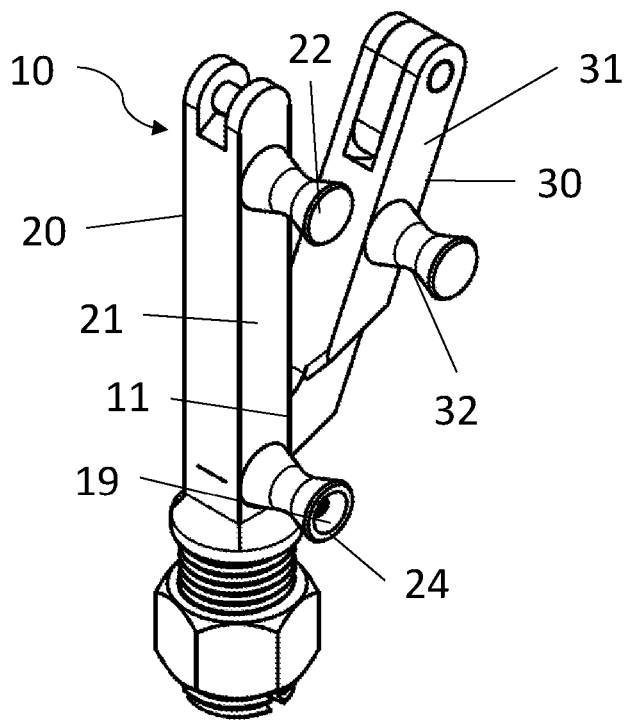
FIG. 1B depicts another perspective view of the embodiment of the device as depicted in FIG. 1A according to the present disclosure with three projecting members.

The present disclosure provides a device for releasably retaining a carabiner. FIGS. 1A and 1B depict various perspective views of an embodiment of the device 10 according to the present disclosure. The device 10 may include an elongate body 20 with a jaw member 30 hingedly attached at a first position 11 thereto. A longitudinal axis of the elongate body 20 and a longitudinal axis of the jaw member 30 define a first plane. The jaw member 30 may be movable towards and away from the elongate body 20 in the first plane. Although the first position 11 is depicted in FIGS. 1A and 1B at a relatively proximal position of the elongate body 20 and the jaw member 30, one skilled in the art should appreciate that the first position 11 may also be located at a relative more distal position or at an even more proximal position. It would also be appreciated that the jaw member 30 may be hingedly attached to the elongate body 20 in an inverted manner such that the opening formed by the elongate body 20 and the jaw member 30 is oriented towards the proximal end instead of the distal end as has been depicted in FIGS. 1A and 1B.

In one embodiment, a first projecting member 22 and a second projecting member 24 may extend outwardly from a first side 21 of the elongate body 20 and away from the first plane. A third projecting member 32 may extend outwardly from a first side 31 of the jaw member 30 and away from the first plane. It would be appreciated that the projecting members may not be permanently disposed on the elongate body 20 and jaw member 30, but may be detachably disposed thereon by any conventional means known to one skilled in the art.

The first projecting member 22 and the second projecting member 24 may be configured to receive a spine 58 of a carabiner inserted therebetween and said third projecting member 32 may urge a gate 62 of the carabiner 50 toward the spine 58 of the carabiner 50 (will be discussed further with reference to FIGS. 10A to 10C below). It should be noted that the relative positions of the first projecting member 22, the second projecting member 24, and the third projecting member 32 shown in FIGS. 1A and 1B are illustrative only and one skilled in the art may adjust the relative positions as needed according to the size of the carabiner to be retained.

It would also be appreciated that the relative positions of the projecting members may not need to be permanently determined at manufacture, and potentially the users may adjust the positions of the projecting members as needed.

For example, in some embodiments, the projecting members may be detached from the elongate body 20 and jaw member 30 by the users and reattached to the appropriate positions as needed. A series of attachment points at predetermined intervals may be provided on the elongate body 20 and jaw member 30 for customised attachment of the projecting members. Alternatively, a rail (not shown) may be provided on the elongate body 20 and jaw member 30 for engagement with the projecting members, such that the positions of the projecting members may be slidingly adjusted by the users as needed.

Figure 1C:
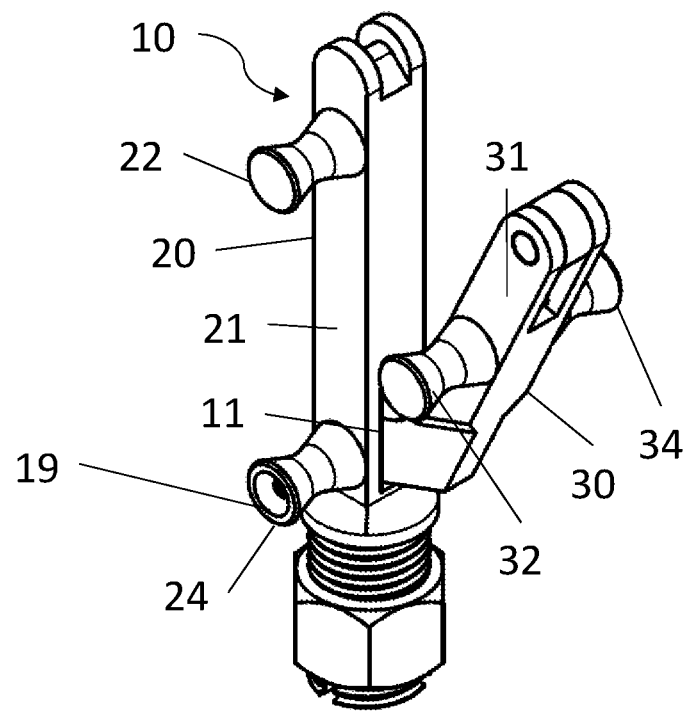
FIG. 1C depicts a perspective view of an alternative embodiment of the device according to the present disclosure with four projecting members.
Figure 1D:
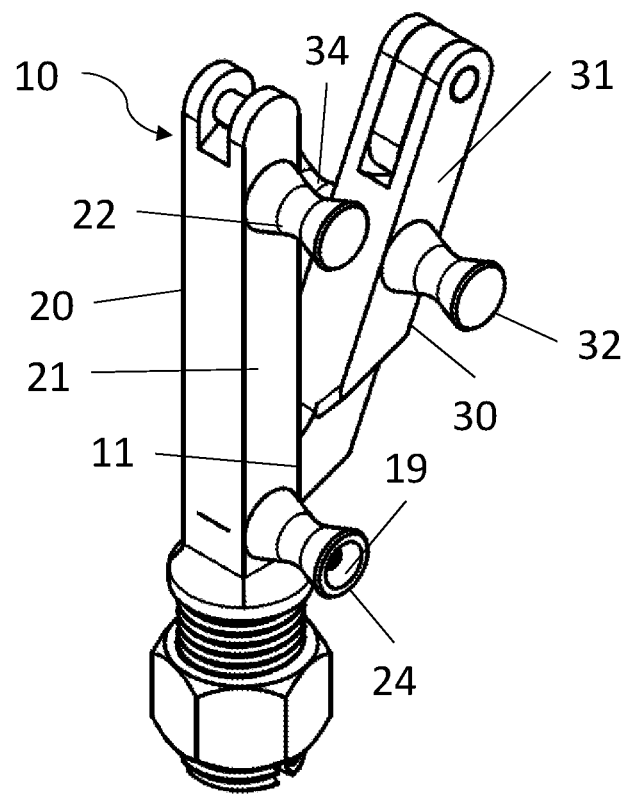
FIG. 1D depicts another perspective view of the alternative embodiment of the device as depicted in FIG. 1C according to the present disclosure with four projecting members.

FIGS. 1C and 1D depict perspective views of another embodiment of the device 10 according to the present disclosure. In this embodiment, the device 10 further includes a fourth projecting member 34 extending outwardly and away from an opposed side to the first side 31 of the jaw body 30. Alternatively, a fourth projecting member 34 may extend outwardly and away from an opposed side to the first side 25 of the elongate body 20 (not shown). Though the fourth projecting member 34 is depicted in FIGS. 1C and 1D to be aligned with the third projecting member 32 on the same longitudinal axis, this is merely for illustrative purposes and it would be understood that the fourth projecting member 34 may extend outwardly away from an opposed side to the first side 31 of the jaw member 30 or the first side 21 of the elongate body 20, without necessarily extending from the opposite side of the third projecting member 32 or the first projecting member 22.

Figure 1E:
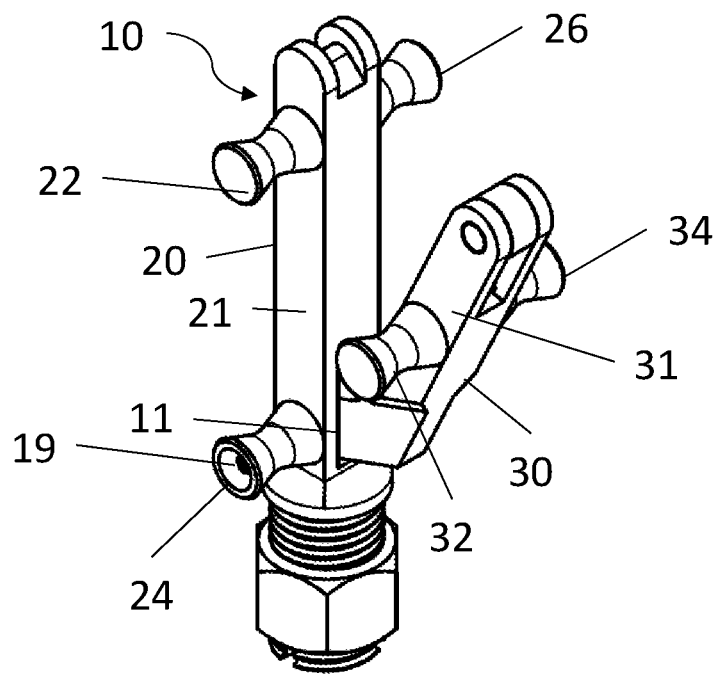
FIG. 1E depicts a perspective view of an alternative embodiment of the device according to the present disclosure with five projecting members.
Figure 1F:
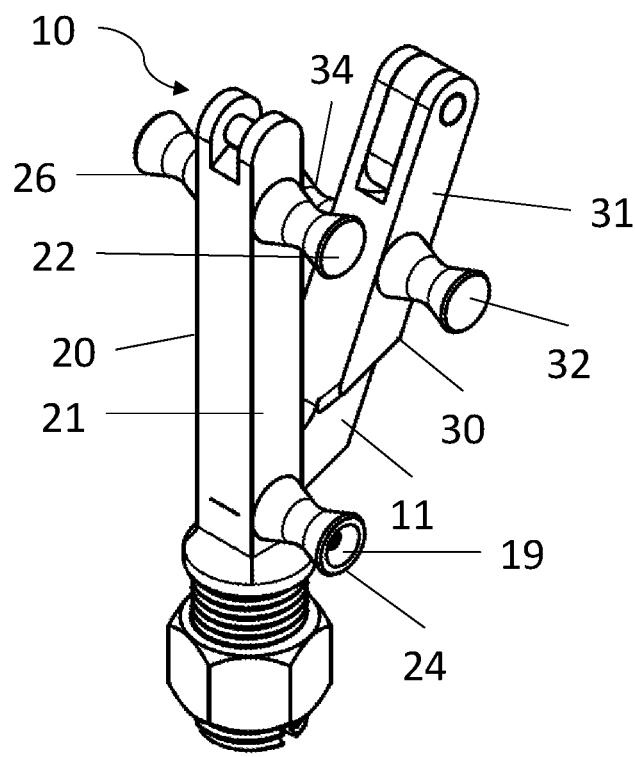
FIG. 1F depicts another perspective view of the embodiment of the device as depicted in FIG. 1E according to the present disclosure with five projecting members.

FIGS. 1E and 1F depict perspective views of another embodiment of the device 10 according to the present disclosure. In this embodiment, the device 10 may further include both a fourth projecting member 34 extending outwardly and away from an opposed side to the first side 31 of the jaw body 30, and a fifth projecting member 26 extending outwardly and away from an opposed side to the first side 21 of the elongate member 20.

Although the fourth projecting member 34 and fifth projecting member 26 are depicted in FIGS. 1E and 1F to extend from the opposite side of the elongate member from the position of the third projecting member 32 and the first projecting member 22 on the same longitudinal axis, respectively, this is merely for illustrative purposes. It would be understood by persons skilled in the art that the fourth projecting member 34 and the fifth projecting member 26 may extend outwardly away from an opposed side to the first side 31 of the jaw member 30 and to the first side 21 of the elongate body 20, without necessarily being aligned with the third projecting member 32 and first projecting member 22, respectively.

Figure 1G:
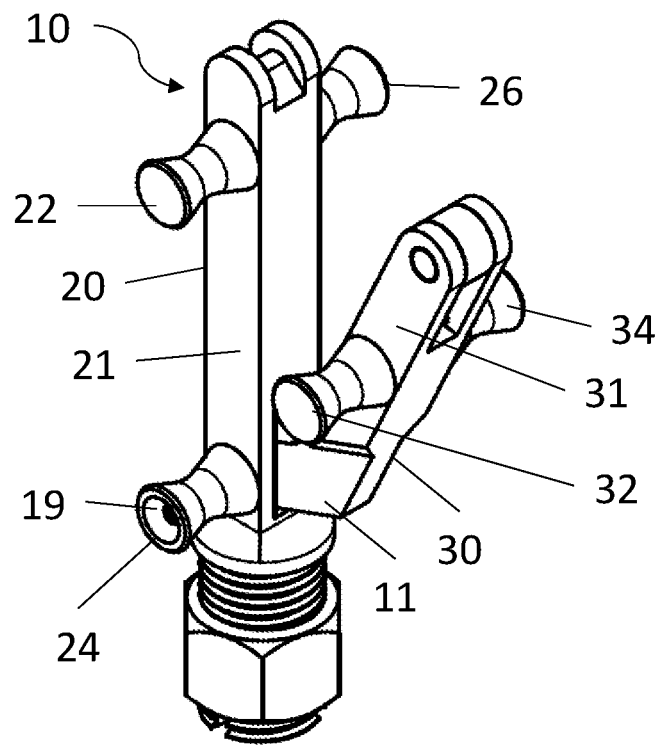
FIG. 1G depicts a perspective view of an alternative embodiment of the device according to the present disclosure with six projecting members.
Figure 1H:
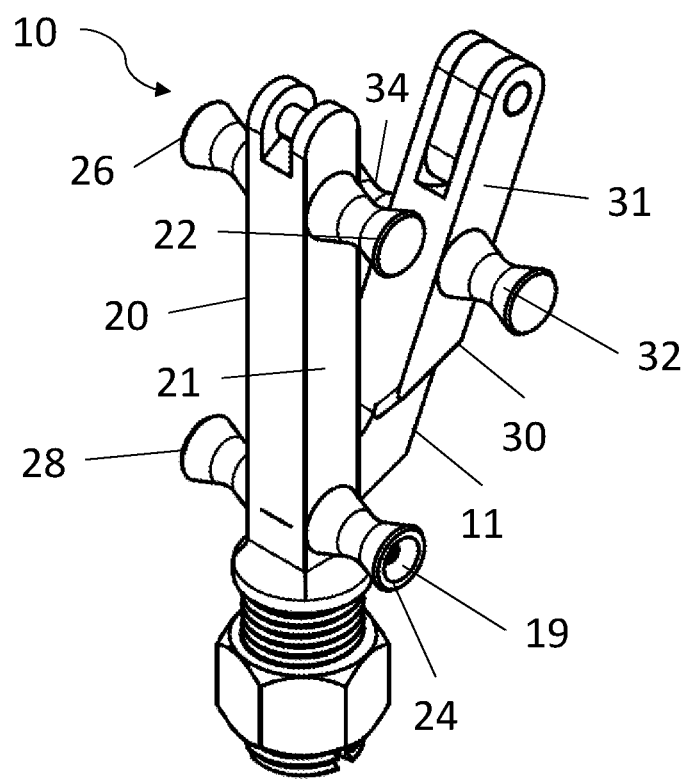
FIG. 1H depicts another perspective view of the embodiment of the device as depicted in FIG. 1G according to the present disclosure with six projecting members.

FIGS. 1G and 1H depict perspective views of another embodiment of the device 10 according to the present disclosure. In this embodiment, the device 10 further includes a fourth projecting member 34 extending outwardly and away from an opposed side to the first side 31 of the jaw body 30, a fifth projecting member 26 extending outwardly and away from an opposed side to the first side 21 of the elongate member, and a sixth projecting member 28 extending outwardly and away from an opposed side to the first side 31 of the elongate member 20.

Although the fourth projecting member 34, the fifth projecting member 26 and the sixth projecting member 28 are depicted in FIGS. 1G and 1H to be aligned with the third projecting member 32, the first projecting member 22 and the second projecting member 24 on the same longitudinal axis, respectively, this is merely for illustrative purposes and it should be understood that the fourth projecting member 34, the fifth projecting member 26 and the sixth projecting member 28 may extend outwardly away from an opposed side to the first side 31 of the jaw member 30 and to the first side 21 of the elongate body 20, without aligning with the third projecting member 32, first projecting member 22 and second projecting member 24, respectively.

As will be discussed with reference to FIGS. 11A to 11C below, at least one of the first projecting member 22 and the second projecting member 24 on the first side 21 of the elongate body 20, and the third projecting member 32 on the first side 31 of the jaw member 30, are disposed on the elongate body 20 and jaw member 30 respectively so as to receive a first part of a loop 104 of a rope 100 therebetween. The fourth projecting member 34 on the opposed side of the elongate body 20 or jaw member 30 is configured to guide a second part of the loop 104 of the rope 100 thereon.

For the embodiment where both the fourth projecting member 34 and fifth projecting member 26 are present, the fourth projecting member 34 on the opposed side of the jaw body 30 and the fifth projecting member 26 on the opposed side of the jaw member 30 are disposed on the elongate body 20 and jaw member 30 respectively so as to receive a second part of the loop 104 of the rope 100 therebetween.

For the embodiment where six projecting members are present, the first, second and third projecting member 32 may be configured to releasably retain a carabiner 50 on a first side 21 of the elongate body 20 and a first side 31 of the jaw member 30, whilst the fourth projecting member 34, the fifth projecting member 26 and the sixth projecting member 28 may additionally be configured to releasably retain a carabiner 50 on an opposite side of the elongate body 20 and the jaw member 30. An example of this exemplary configuration is depicted in FIGS. 10A to 10C which will be discussed further below In another embodiment, the first projecting member 22, the second projecting member 24 and the third projecting member 32 extend outwardly and in different directions relative to each other. In another embodiment, the first projecting member 22, the second projecting member 24 and the third projecting member 32 extend outwardly and parallel relative to each other. In another embodiment, wherein the first projecting member 22, the second projecting member 24 and the third projecting member 32 extend outwardly and orthogonal to the first plane.

In another embodiment, the third projecting member 32 is disposed on a first side 31 of the jaw member 30. The position of the third projecting member 32 is preferably between the first projecting member 22 and the second projecting member 24 when said jaw member 30 is adjacent a longitudinal axis of the elongate body 20. In another embodiment, the first projecting member 22, the second projecting member 24 and the third projecting member 32 may be identical in shape and size although not necessary.

Any individual part or the entirety of the device 10 may be made of any materials known in the art, including metallic materials, non-metallic materials, and/or composite materials.

The person skilled in the art would appreciate that the presence of the first projecting member 22, the second projecting member 24 and the third projecting member 32 are sufficient to securely retain the carabiner together with downwards force from gravity and applied load. In an embodiment, the surfaces of the projecting members and the surfaces of the carabiner and/or rope have low coefficient of friction in order to allow the rope in contact with the projecting members to slide across the projecting members easily. Preferably, the projecting members are made of materials including rigid plastic, for example resins selected from the group consisting of acrylic resins, for example polymethyl methacrylate (PHMA), polycarbonate, polyvinyl chloride, polyethylene in either of high density polyethylene and low density polyethylene, polypropylene, polyurethane, polystyrene, fluoropolymers, acrylonitrile-butadienestyrene (ABS). In another embodiment, the materials can be blended to create combination plastics, such as CPVC, ABS/polycarbonate, ABS/PVC, polycarbonate/acrylic, or PVC/acrylic. In another embodiment, biodegradable thermoplastics such as polylactic acid (PLA) and cellulosics such as ethyl cellulose, cellulose acetate, cellulose acetate butyrate, cellulose acetate propioniate, and cellulose nitrate may be used.

The above configuration of the first projecting member 22, the second projecting member 24 and the third projecting member 32 may be similarly applicable to the fourth projecting member 34, the fifth projecting member 26 and the sixth projecting member 28.

In an embodiment, at least one of the first projecting member 22, second projecting member 24, third projecting member 32, fourth projecting member 34 (if present), fifth projecting member 26 (if present), and sixth projecting member 28 (if present) includes a reinforcing element engaged therein. In an embodiment, the reinforcing element may be disposed within the projecting member. In another embodiment, the projecting member may include a void 19 for receiving the reinforcing element. In an embodiment, the reinforcing element may be a metallic element. In an embodiment, the metallic element may be a screw member threadingly engaged therewith.

Although the device 10 is depicted in FIGS. 2A to 10F as possessing six projecting members, it would be appreciated that the fourth projecting member 34, the fifth projecting member 26 and the sixth projecting member 28 are optional. It would be appreciated that if six projecting members are used, the clip in direction may be use from the left side or the right side.

Figure 2A:
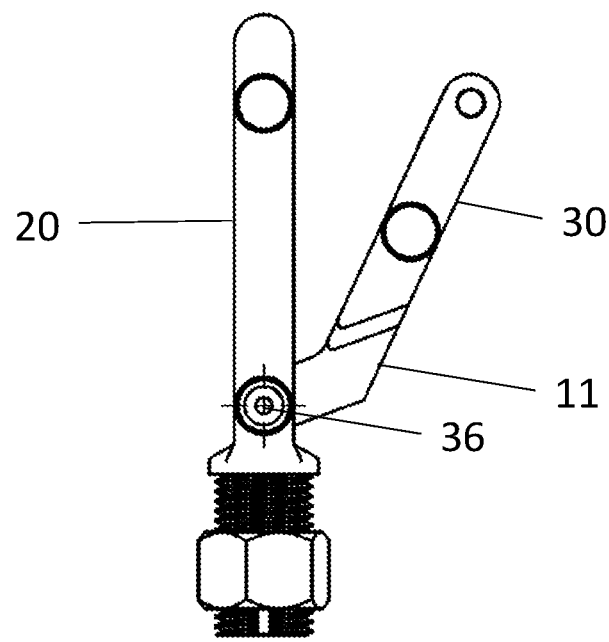
FIG. 2A depicts a front view of the embodiment of the device depicted in FIG. 1G according to the present disclosure.

FIG. 2A depicts the hinge 36 formed between the elongate body 20 and the jaw member 30 at the first position 11. Whilst the proximal end of the jaw member 30 is depicted as being received by the proximal end of the elongate body 20 in a complementary manner, this is merely for illustrative purpose only. One skilled in the art should appreciate that the elongate body 20 and the jaw member 30 may be hingedly attached to each other in a scissor-like manner by various joint configurations including pivot, pin joint etc.

Figure 2B:
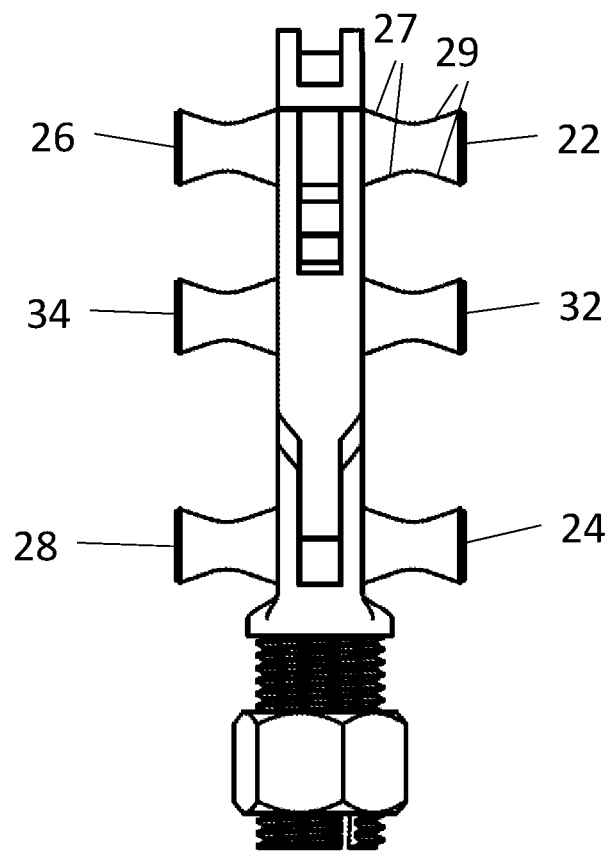
FIG. 2B depicts a side view of the embodiment of the device depicted in FIG. 1G according to the present disclosure.

FIG. 2B depicts a side view of the embodiment of the device 10 as depicted in FIG. 1G according to the present disclosure. In an embodiment, the third projecting member 32 may be disposed on a first side 31 of the jaw member 30 such that it extends from a position which is between the first projecting member 22 and the second projecting member 24 when said jaw member 30 is adjacent a longitudinal axis of the elongate body 20.

Figure 10A:
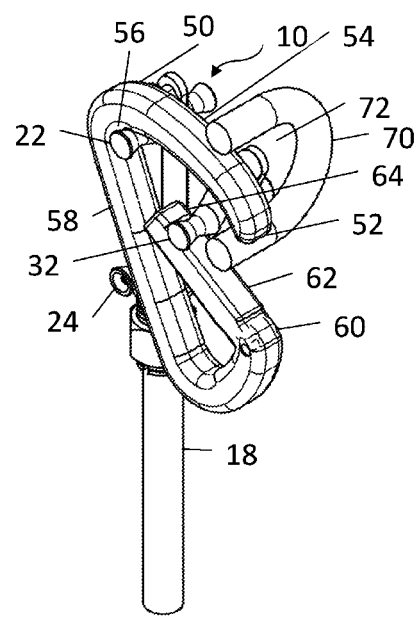
FIG. 10A depicts a perspective view of an embodiment of the device in use for clipping the carabiner onto a bolt hanger, where the nose of the carabiner has just passed through a void of the bolt hanger.
Figure 10B:
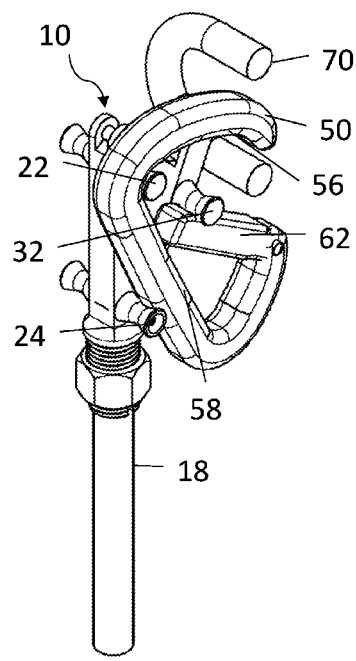
FIG. 10B depicts another perspective view of an embodiment of the device according to the present disclosure depicted in FIG. 10A in use.
Figure 10C:
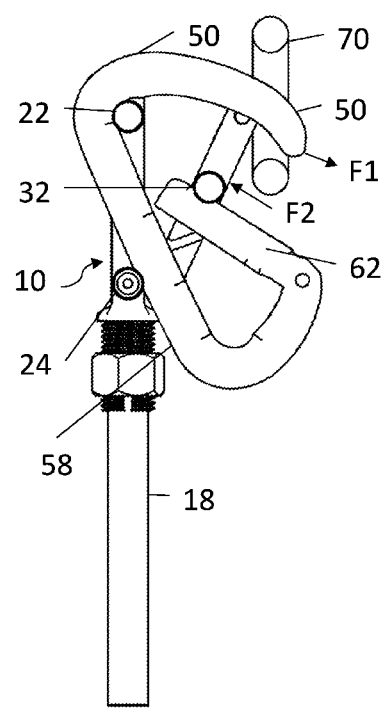
FIG. 10C depicts a front view of an embodiment of the device according to the present disclosure depicted in FIG. 10A in use.

Advantageously, in the embodiment depicted in FIG. 2B, the first projecting member 22, second projecting member 24, third projecting member 32, fourth projecting member 34 (if present), fifth projecting member 26 (if present), and sixth projecting member 28 (if present) include a first tapered frusto-conical section 27 attached to a second frusto-conical section 29, and the first tapered frusto-conical section 27 and the second tapered frusto-conical section 29 taper toward each other such that the space formed by the joining of the first and second tapered frusto-conical sections 27, 29 can securely retain the carabiner and avoid the carabiner from accidentally falling off from the side of the device 10 (an example of the retention of the carabiner is depicted in FIGS. 10A to 10C). Additionally, the first and second tapered frusto-conical sections 27, 29 at the first projecting member 22, third projecting member 32, fourth projecting member 34 and the fifth projecting member 26 (if present) can guide a rope 100 thereabout (as depicted in FIGS. 11A to 11C). It would be appreciated that one or more of the projecting members may be configured in this way without departing from the scope of the present disclosure and the device claimed herein.

Figure 3:
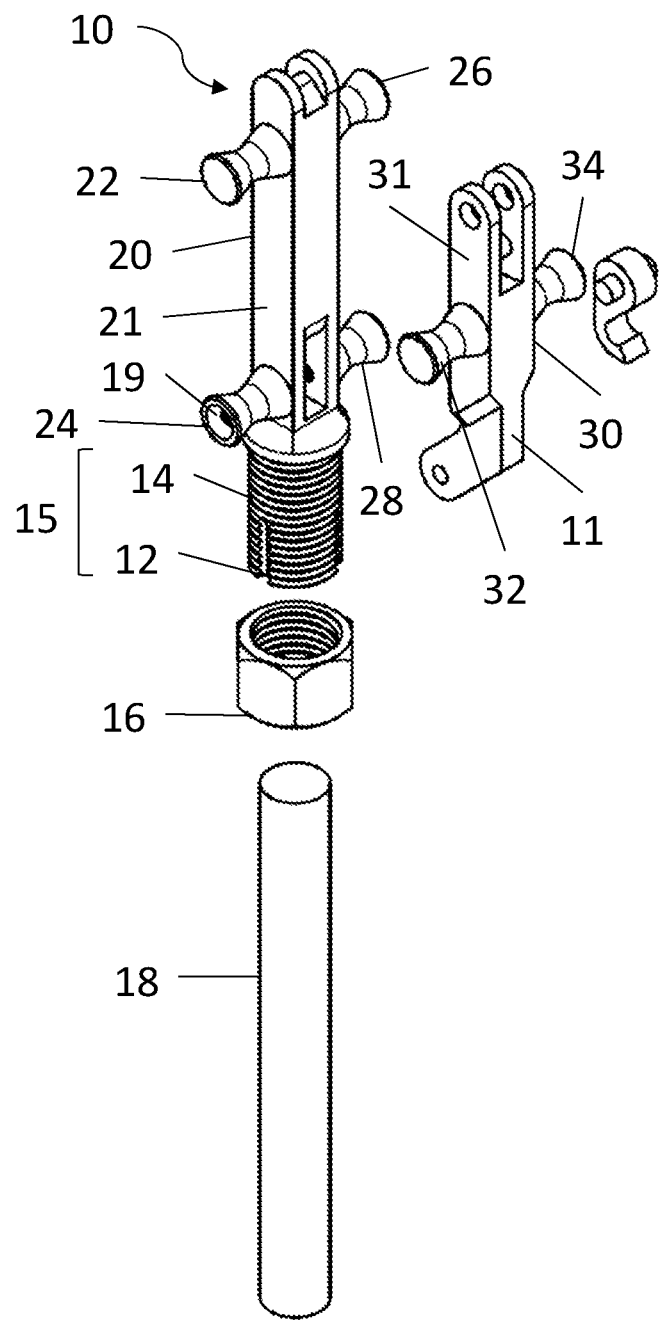
FIG. 3 depicts an exploded view of the embodiment of the device depicted in FIG. 1G according to the present disclosure.

FIG. 3 depicts an exploded view of the embodiment of the device as depicted in FIG. 1G according to the present disclosure.

In the embodiment depicted, the device 10 includes a base 15 having an aperture 12 for receiving an extension member 18. Optionally the extension member 18 may be an extensible elongate object (e.g. a telescoping pole) or an inextensible elongate object (e.g. broomstick, rod, a stick, a bar, or a shaft) which is received in the aperture 12 of the base 15.

The extension member 18 may be secured within the aperture 12 of the base 15 by a locking mechanism. As depicted, this mechanism may include an externally threaded portion 14 and a corresponding nut 16 engageable thereabout, although one skilled in the art would appreciate that any other securing means known in the art may be used.

Figure 4:
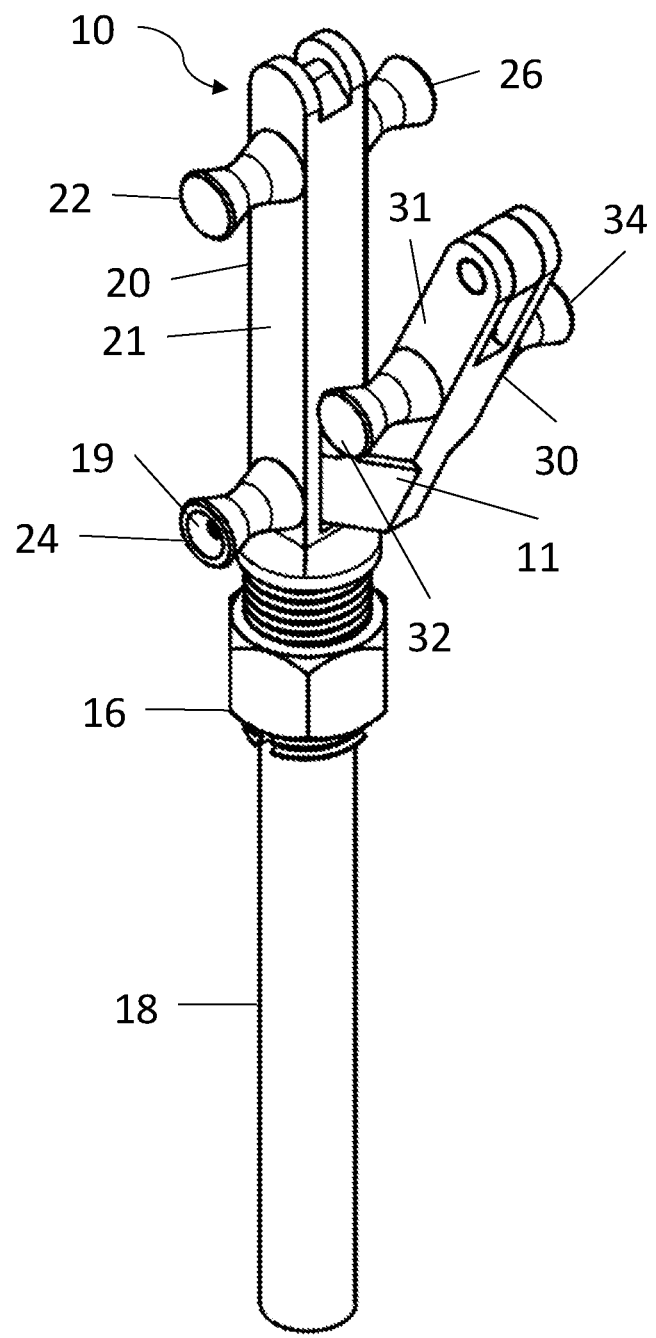
FIG. 4 depicts a perspective view of the embodiment of the device as depicted in FIG. 3 in an assembled state according to the present disclosure.

FIG. 4 depicts a perspective view of the embodiment of the device 10 as depicted in FIG. 3 in an assembled state.

In the embodiment depicted, the jaw member 30 is shown spaced apart and movable towards and away from the elongate body 20 in a first plane. Advantageously, the jaw member 30 is engageable with the elongate body 20 so as to be substantially adjacent thereto.

As will be discussed further with reference to FIGS. 10A to 10C below, the presence of the first projecting member 22, the second projecting member 24 and the third projecting member 32 allow the device 10 according to the present disclosure to releasably retain a carabiner 50.

In an embodiment, the device 10 according to the present disclosure may further include an engagement mechanism 40 which may be advantageous when the device 10 is additionally used for releasably retaining a rope 100. Various engagement mechanisms known in the art may be employed to hold the elongate body 20 and the jaw member 30 in close proximity, including but not limited to complementary securing means, a substantially inextensible member, and fastening means as discussed herein in more detail with reference to FIGS. 11A to 11I. The person skilled in the art would also appreciate that the actual configuration of the engagement mechanism 40 is for illustrative purposes and is not limiting.

Figure 5:
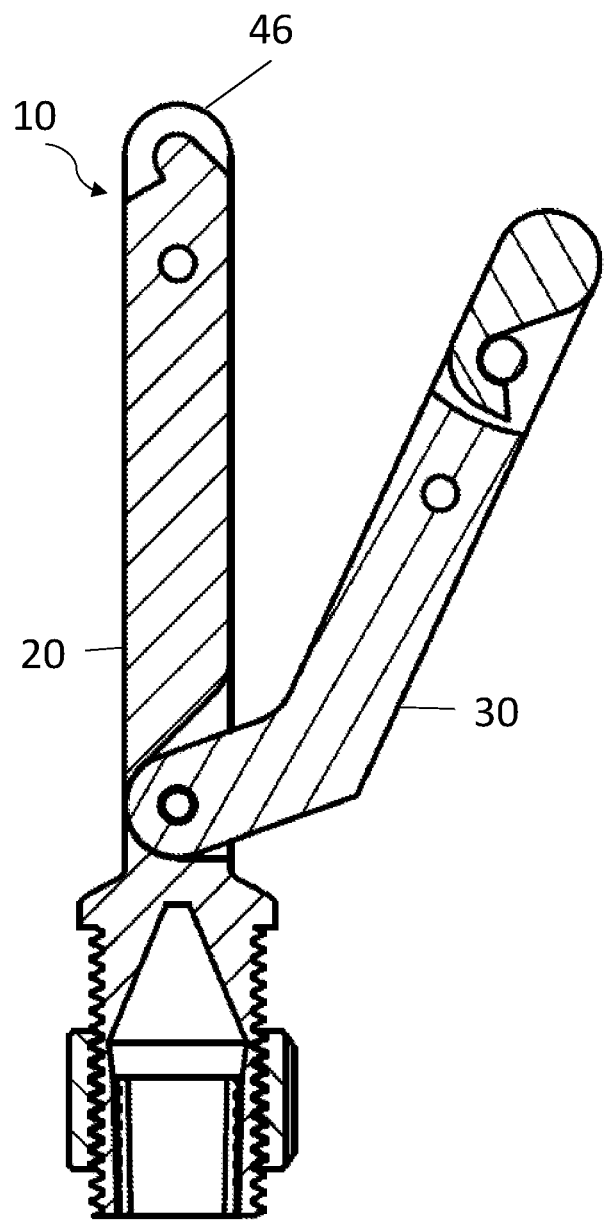
FIG. 5 depicts a cross-section view of the engagement mechanism of an embodiment of the device in an unengaged state according to the present disclosure, where the engagement mechanism is a pivotally attached hook.
Figure 6:
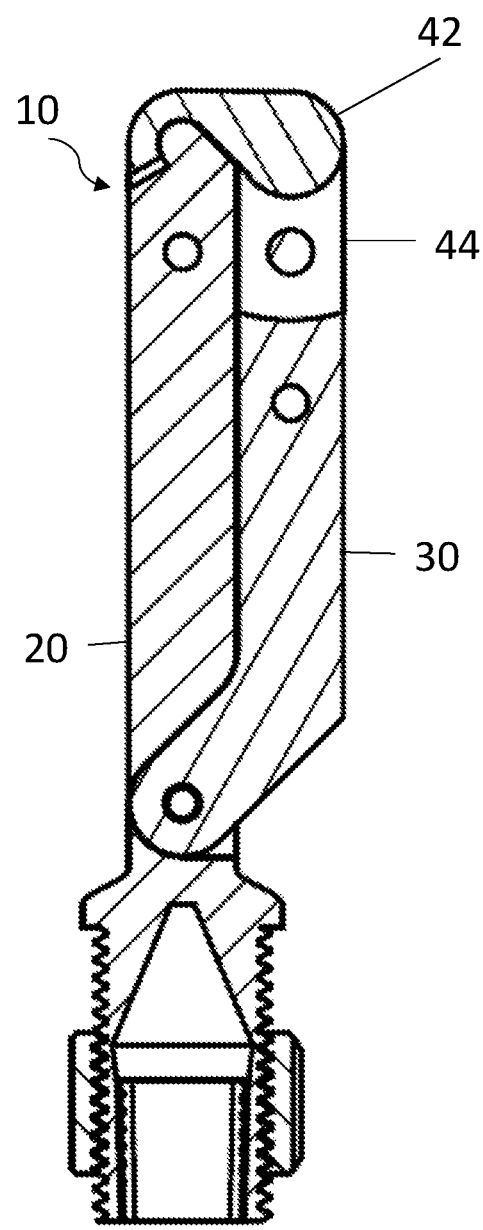
FIG. 6 depicts a cross-section view of the engagement mechanism of an embodiment of the device in an engaged state according to the present disclosure, where the engagement mechanism is a pivotally attached hook.
Figure 7C:
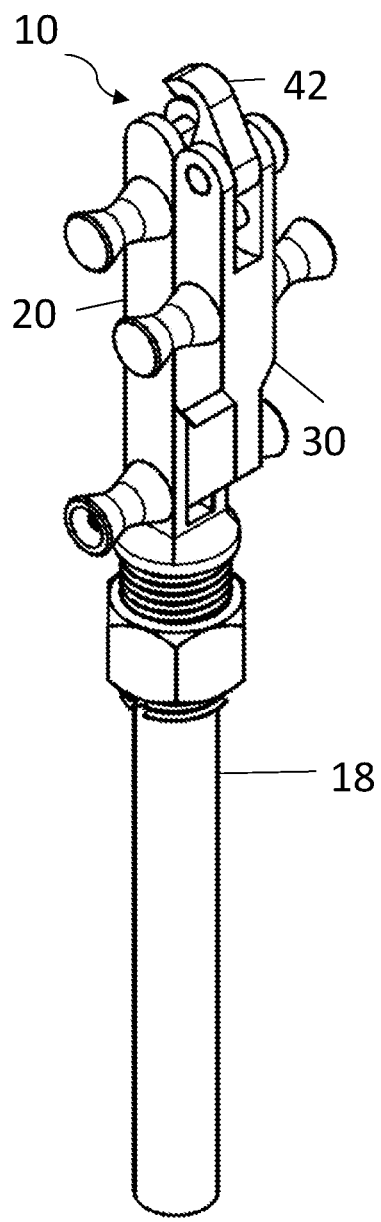
FIG. 7C depicts a perspective view of the engagement mechanism of an embodiment of the device during transition from an unengaged state as depicted in FIG. 7A to an engaged state according to the present disclosure.
Figure 7D:
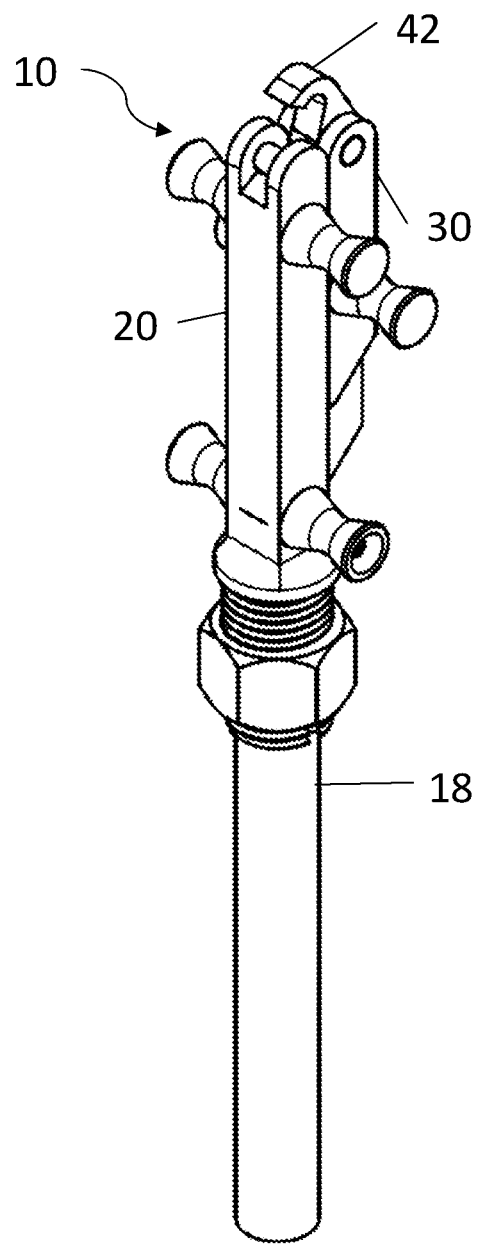
FIG. 7D depicts another perspective view of the engagement mechanism of an embodiment of the device according to the present disclosure during transition of the device as depicted in FIG. 7C.
Figure 7E:
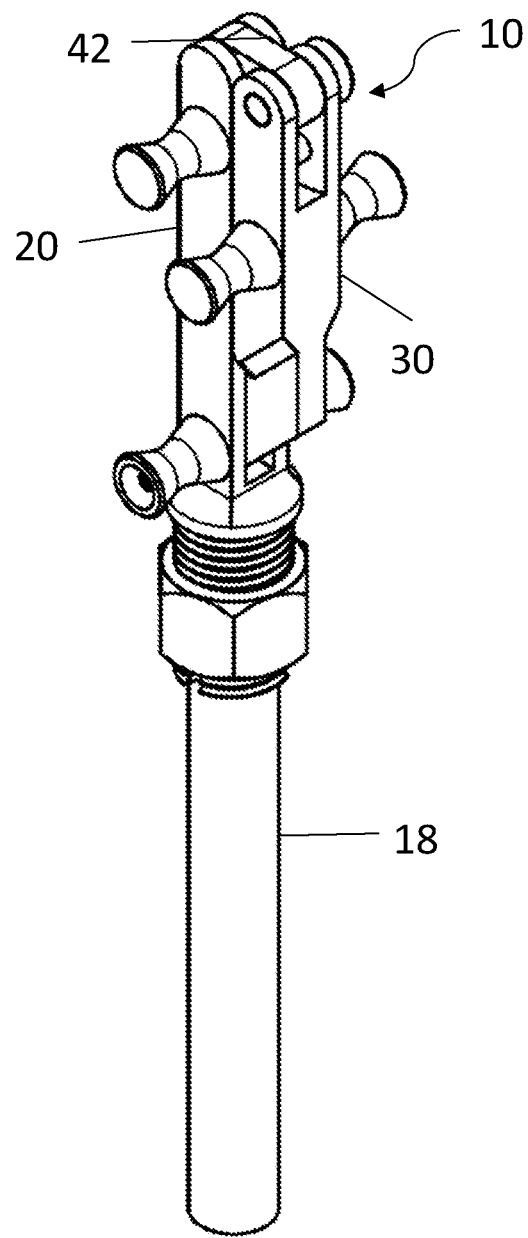
FIG. 7E depicts a perspective view of the engagement mechanism of an embodiment of the device in an engaged state as depicted in FIG. 6 according to the present disclosure.

FIGS. 5 and 6 depict cross-sectional views of an embodiment of the elongated body 20 and the jaw member 30 in an unengaged state and an engaged state, respectively. The engagement mechanism 40 depicted here includes a complementary securing means. As depicted in FIG. 5, the complementary securing means may be a pivotally attached hook 42 and a corresponding recess 46. When the elongate body 20 and the jaw member 30 are in an unengaged state, the pivotally attached hook 42 does not engage with the corresponding recess 46. The device 10 may optionally include a groove 44 disposed adjacent to the pivotally attached hook 42 for receiving (and storing) the pivotally attached hook 42 when not in use.

When the elongate body 20 and the jaw member 30 are in an engaged state as depicted in FIG. 6, the pivotally attached hook 42 may engage with the corresponding recess 46 for securing the elongate body 20 and the jaw member 30 so as to be substantially adjacent and aligned next to each other as shown.

The person skilled in the art would appreciate that in the engaged state, the elongate body 20 and the jaw member 30 do not have to be physically in contact with each other as depicted in FIG. 6. So long as the elongate body 20 and the jaw member 30 are in sufficiently close proximity such that the first projecting member 22, the third projecting member 32, the fifth projecting member 26 (if present) and the fourth projecting member 34 (if present) are capable of receiving a rope 100 therebetween as explained further below with reference to FIGS. 11A to 11C below.

It should be noted that although the pivotally attached hook 42 and the corresponding recess 46 are depicted as being disposed at the distal ends of the jaw member 30 and the elongate body 20, respectively, in FIGS. 5 and 6, the pivotally attached hook 42 and the corresponding recess 46 may be arranged so as to extend from the elongate body 20 and the jaw member 30 (i.e. reversed configuration). Also, persons skilled in the art would appreciate that the positions of the pivotally attached hook 42 and the corresponding recess 46 are not limited to the distal ends of the elongate body 20 and jaw member 30 as depicted, but may be disposed at any position on the elongate body 20 and the jaw member 30 so long as the elongate body 20 and the jaw member 30 are secured in relation to each other.

FIGS. 7A to 7E depict perspective views of an embodiment of the device 10 according to the present disclosure, where the pivotally attached hook 42 is depicted to be in transition from an unengaged state as depicted in FIG. 5 to an engaged state as depicted in FIG. 6 according to the present disclosure. It would be appreciated that as depicted, in the arrangement shown in FIGS. 7A and 7B the jaw member 30 and elongate body 20 are angled with respect to each other, whereas in the arrangement of FIGS. 7C and 7D, they are substantially adjacent but disengaged; and finally are engaged adjacent to each other in the state depicted in FIG. 7E.

Figure 8A:
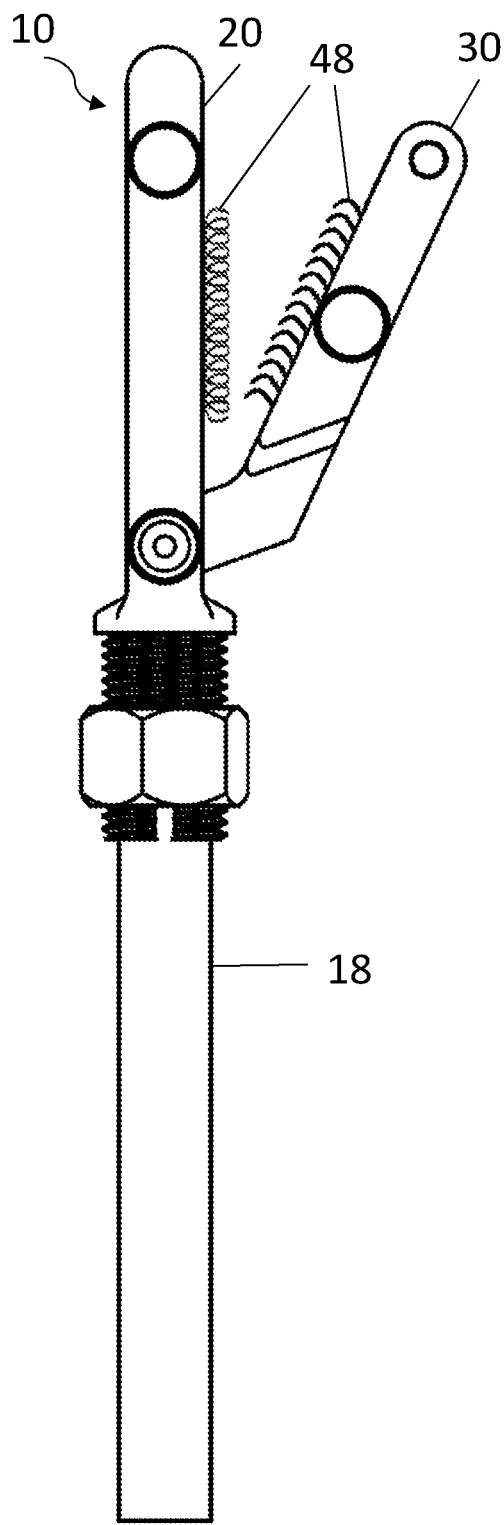
FIG. 8A depicts a perspective view of another engagement mechanism of an embodiment of the device according to the present disclosure, where the engagement mechanism is hook and loop fastener.

FIG. 8A depicts a perspective view of an alternate engagement mechanism of an embodiment of the device 10 according to the present disclosure. In this embodiment, the engagement mechanism may be fastening means. One example may be a hook and loop fastener 48 as depicted in FIG. 8A. Other examples of fastening means may include zipper and pressure-sensitive adhesive.

Figure 8B:
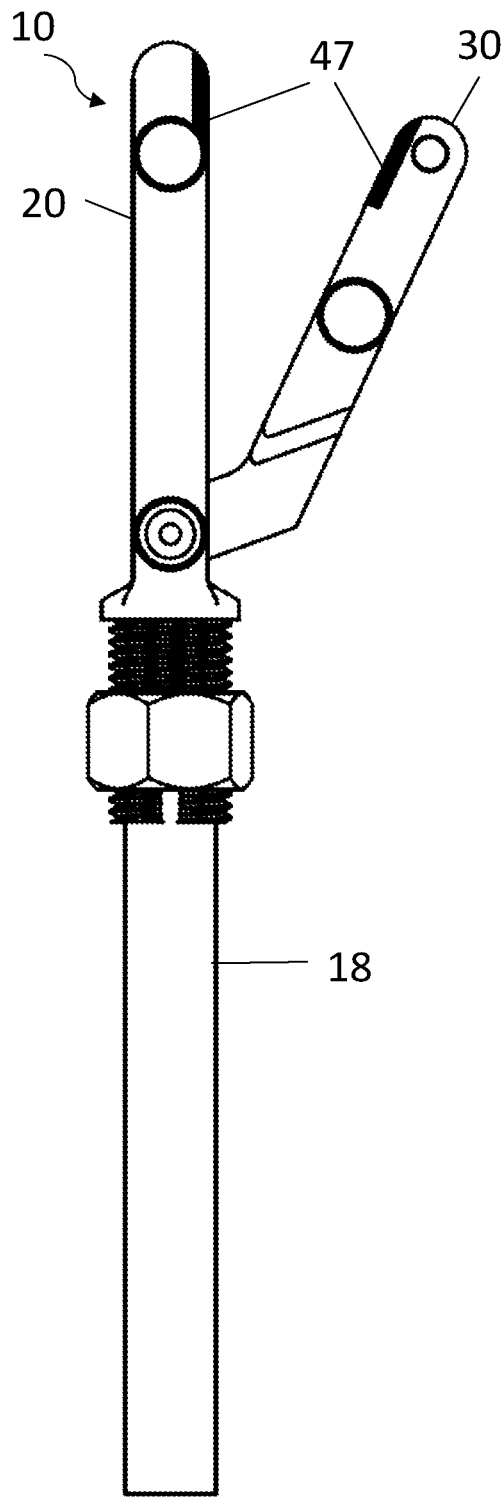
FIG. 8B depicts another engagement mechanism having magnetic members in the elongate body and the jaw member.

FIG. 8B depicts another engagement mechanism which is achieved by magnetic members 47 in the elongate body 20 and the jaw member 30. As depicted there are two magnetic members, although additional members with appropriate fields may also be included.

Figure 9:
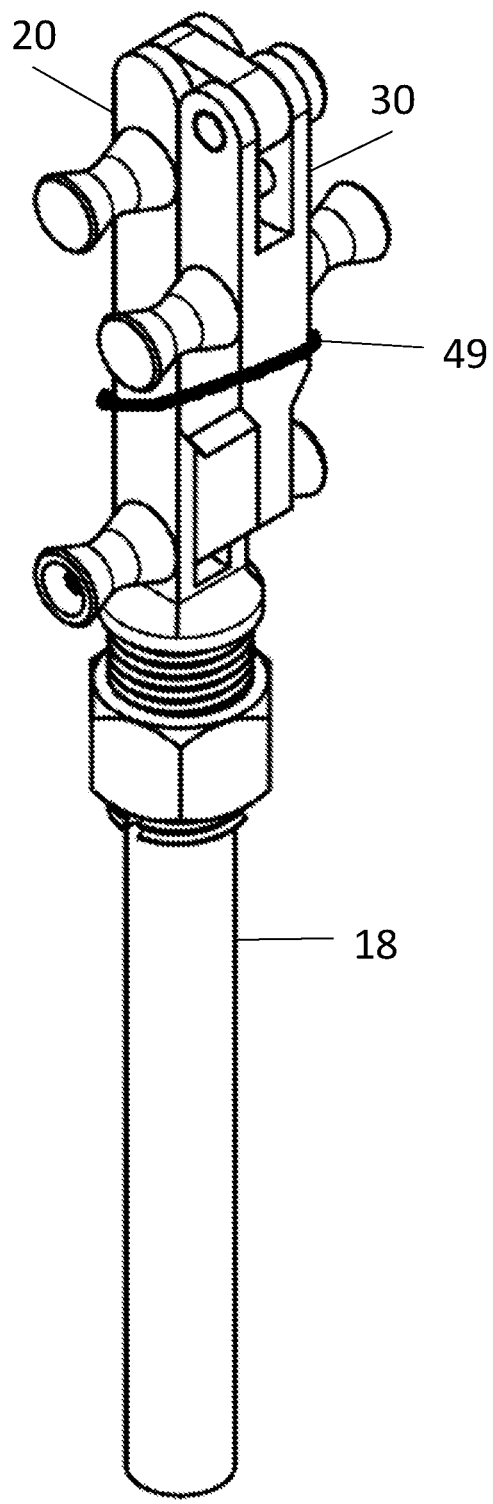
FIG. 9 depicts a perspective view of another engagement mechanism of an embodiment of the device according to the present disclosure, where the engagement mechanism is an elastic member.

FIG. 9 depicts a perspective view of another engagement mechanism of an embodiment of the device 10 according to the present disclosure. In this embodiment, the engagement mechanism may be is a substantially inextensible member 49 as depicted in FIG. 9. In other embodiments, the substantially inextensible member may be a rope, a ribbon, a thread, a wire, or any other means known in the art. The substantially inextensible member may also be an elastic member such as an elastic band or similar which is wrapped about the jaw member 30 and elongate body 20 so as to prevent relative movement therebetween.

In an embodiment, any part or the entirety of the device 10 according to the present disclosure may be manufactured by techniques known in the art, including molding and 3D-printing.

Exemplary uses for the device 10 according to the present disclosure are explained below in more details with references to FIGS. 10A to 10F and 11A to 11I.

Example 1: For Releasably Retaining a Carabiner

FIGS. 10A to 10C depict an embodiment of the device 10 in use for releasably retaining a carabiner 50 in order to clip the carabiner 50 onto a bolt hanger according to the present disclosure.

In order to releasably retain the carabiner 50 on the device 10, the first projecting member 22 and the second projecting member 24 are configured to receive a spine 58 of a carabiner 50 inserted therebetween. In this position, the third projecting member 32 on the jaw member 30 is located and disposed such that it urges a gate 62 of the carabiner 50 toward the spine 58 of the carabiner 50.

In the specific embodiment shown in FIGS. 10A to 10C, the first projecting member 22 presses against one side of the spine 58 of the carabiner 50 near the elbow 56, the second projecting member 24 press against the other side of the spine 58 of the carabiner 50, and the third projecting member 32 presses against one side of the gate 62 of the carabiner 50. Nonetheless, one skilled in the art would appreciate that the positions of the carabiner 50 at which the three projecting members contact are not absolute, and firm retention of the carabiner 50 by the device 10 is possible so long as the device 10 engages with the carabiner 50 at at least three support points.

Figure 10D:
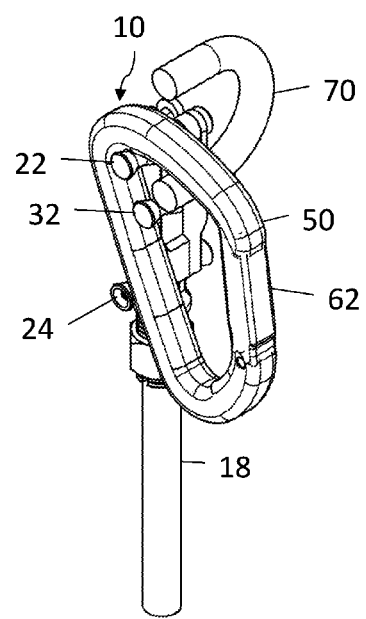
FIG. 10D depicts a perspective view of an embodiment of the device according to the present disclosure once the carabiner has been secured onto the bolt hanger.
Figure 10E:
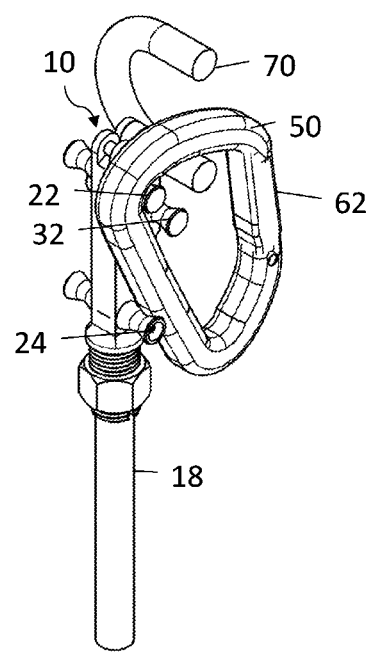
FIG. 10E depicts another perspective view of an embodiment of the device as depicted in FIG. 10D according to the present disclosure.
Figure 10F:
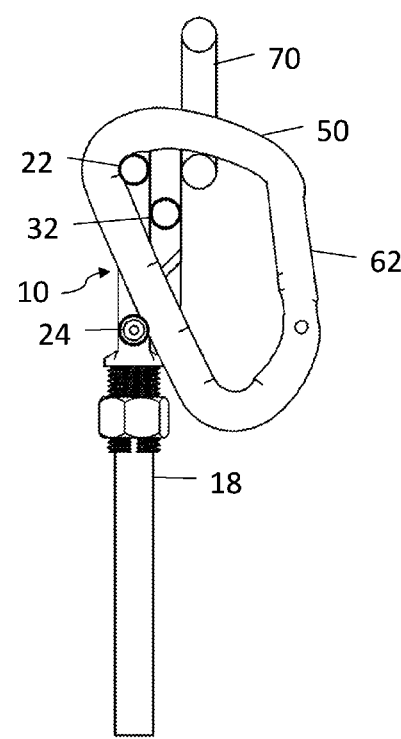
FIG. 10F depicts a side view of an embodiment of the device as depicted in FIG. 10D according to the present disclosure.

When the nose 52 of the carabiner 50 is advanced through the void 72 of the bolt hanger (shown in side view for simplicity) via the force F1 in a first direction, a portion of the bolt hanger would press against the jaw member 30 in an opposite direction by force F2. This would displace the jaw member 30 towards the elongate body 20. When the third projecting member 32 is displaced beyond the tip 64 of the gate 62 of the carabiner 50, a biasing means, such as a spring 60 of the carabiner 50 would retract the gate 62 so as to "close" the gate 62 of the carabiner 50, thereby clipping the carabiner 50 onto the bolt anchors 70 with the basket 54 of the carabiner 50 resting on the bolt anchor 70 due to gravity, as depicted in FIGS. 10D to 10F. The device 10 may then be removed by moving sideways since the device 10 is no longer engaged with the carabiner 50. The person skilled in the art would appreciate that in the engaged state, the elongate body 20 and the jaw member 30 do not have to be physically in contact with each other as depicted in FIGS. 10D to 10F, so long as the third projecting member 32 is displaced beyond the tip 64 of the gate 62 of the carabiner 50 to allow the gate 62 of the carabiner 50 to "close."

Sport climbers typically clip a climbing rope attached to themselves into the hangers to safely arrest any inadvertent fall as they ascend a route.

Typically, the attachment of the rope to an anchor is facilitated by using a quickdraw (also known as an extender), including two carabiners connected by an inextensible tape/similar. In these arrangements, one carabiner of the quickdraw connects with the hanger and the other carabiner receives the rope. Commonly, the rope is also attached to the climber and tensioned by a climbing partner.

In this way, the carabiner is securely engaged with the bolt, and the rope (not shown) may be threaded through another carabiner at the end of the sling or similar. The climber has then safely established protection against a fall; and is able to potentially safely ascend up to and beyond the bolt hanger, depending on the difficulty of the pitch and their skill level. Importantly, protection against a significant fall is provided by engagement of the carabiner with the bolt hanger as described.

Example 2: For Releasably Engaging a Rope With a Carabiner Already Attached in a Hanger In a common situation, when a climber has finished the ascending, he/she descends, detaches the rope from his/her harness and pulls the rope off from all the quickdraws on that route, thus leaving the quickdraws which are still attached to the bolt hangers for another climber to ascend the same route. As such, it may be necessary to engage a rope directly with a quickdraw which has been already engaged with a bolt hanger.

Figure 11A:
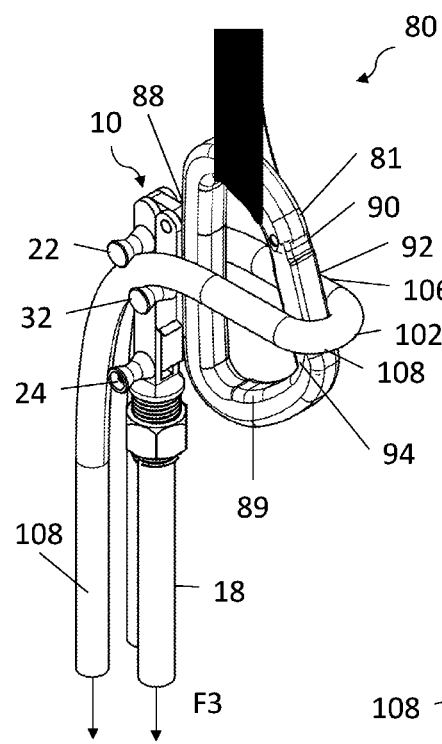
FIG. 11A depicts a perspective view of an embodiment of the device according to the present disclosure in use in an alternative mode in attaching a loop of a rope to the carabiner of a quickdraw, with the loop of the rope wrapped around the carabiner near the gate.
Figure 11B:
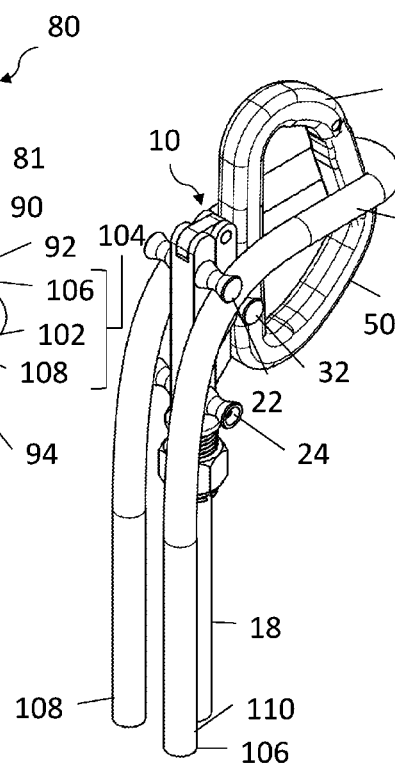
FIG. 11B depicts another perspective view of an embodiment of the device as depicted in FIG. 11A according to the present disclosure.
Figure 11C:
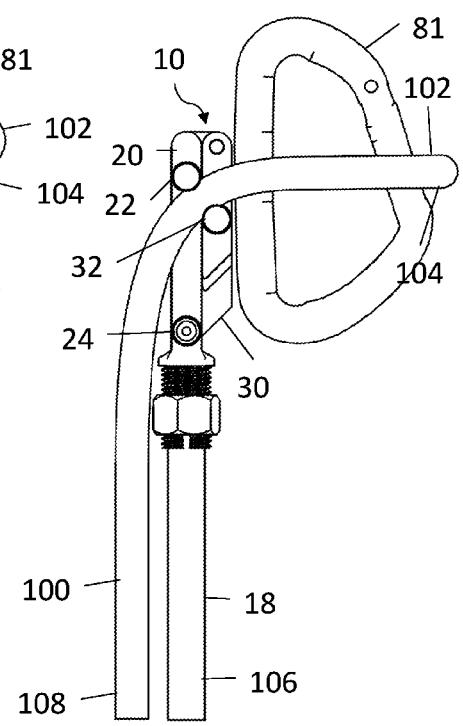
FIG. 11C depicts a side view of an embodiment of the device as depicted in FIG. 11A according to the present disclosure.

FIGS. 11A to 11C depict an embodiment of the device 10 in use for releasably engaging a rope 100 in order to clip the rope 100 onto a lower carabiner 81 of a quickdraw according to the present disclosure.

As depicted in FIG. 11A, the inextensible tape 82 of the quickdraw 80 and the lower carabiner 81 is shown, although the inextensible tape 82 has been removed from subsequent figures for clarity. The other upper carabiner of the quickdraw 80 (not shown) may have already been clipped onto the bolt anchor 70, leaving the quickdraw 80 hanging from a bolt anchor 70 above the climber, but without a rope loop 104 engaged with it.

The device 10 of the present disclosure enables the climber to insert a rope into the quickdraw from a safe (but distant) position from below for belaying by a climbing partner/self in arrangements familiar to those skilled in the art and thereby have the protection potentially available in case of a fall.

When in use, at least one of the first projecting member 22 and the second projecting member 24 on the first side 21 of the elongate body 20, and the third projecting member 32 on the first side 31 of the jaw member 30, are disposed on the elongate body 20 and jaw member 30 respectively so as to receive a first part of a loop 104 of a rope 100 therebetween. The fourth projecting member 34 on the opposed side of the elongate body 20 or jaw member 30 may be configured to guide a second part of the loop 104 of the rope 100 thereon. It should be noted that in order to allow a rope 100 to be releasably engaged on the device 10 for transfer into the lower carabiner 81 of the quickdraw 80 attached to the bolt anchor 70, the fifth projecting member 26 and the sixth projecting member 28 are not necessary, since as one skilled in the art would appreciate the loop 104 of the rope 100 can be engaged so long as there are a minimum of two projecting members on one side for securely engaging one part of the loop 104 and one projecting member on the opposite side of the device 10 for guiding the other part of the loop 104.

If both the fourth projecting member 34 and the fifth projecting member 26 are present, the fourth projecting member 34 on the opposed side of the jaw body 30 and the fifth projecting member 26 on the opposed side of the jaw member 30 are disposed on the elongate body 20 and jaw member 30 respectively so as to receive a second part of the loop 104 of the rope 100 therebetween. This provides additional security for engaging both ends 106, 108 of the loop 104 of the rope 100, preventing one part of the rope loop 104 from inadvertently falling off from one side of the device 10 (in the case that one end of the rope 100 is only resting on the fourth projecting member 34 without the being secured by the fifth projecting member 26). This also allows easier manoeuvring of the device 10.

It should be noted that the sixth projecting member 28 is optional since the sixth projecting member 28 is not required to engage the rope 100.

When in use, the loop 104 of the rope 100 extends from the bottom of the lower carabiner 81 of the quickdraw 80 in a position where it may be subsequently engaged in the lower carabiner 81.

As shown, the rope loop 104 presses against the gate 92 of the lower carabiner 81, whilst the both ends 106, 108 of the rope 100 may be pulled downwards by the user by force F3 to urge the spine 88 of the lower carabiner 81 towards the jaw member 30 of the device 10.

Figure 11D:
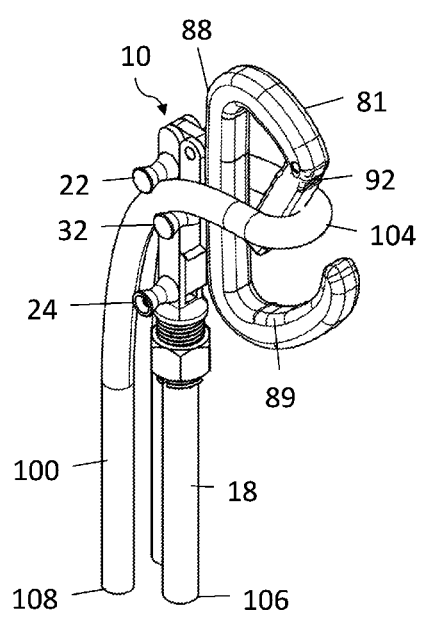
FIG. 11D depicts a perspective view of an embodiment of the device as depicted in FIG. 11A according to the present disclosure in which the loop of the rope has pulled the gate of the carabiner towards the spine of the carabiner.
Figure 11E:
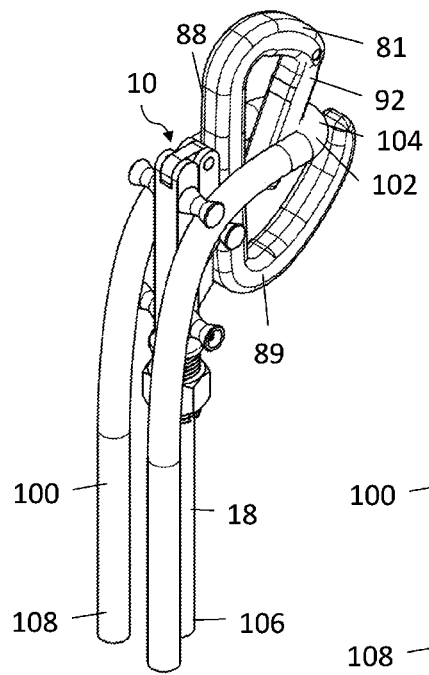
FIG. 11E depicts another perspective view of an embodiment of the device as depicted in FIG. 11D according to the present disclosure.
Figure 11F:
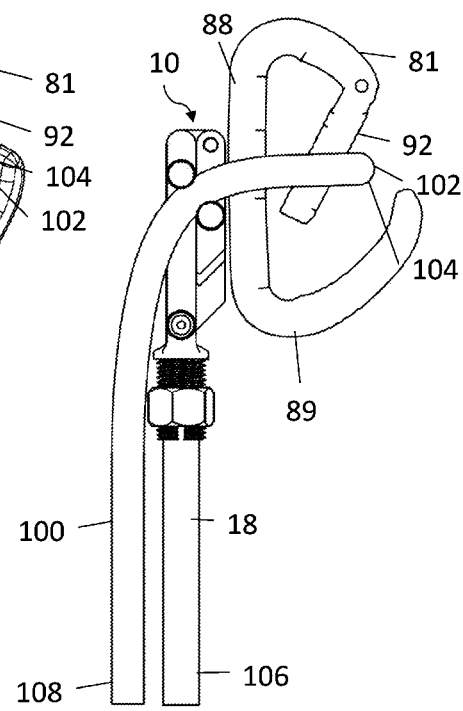
FIG. 11F depicts a side view of an embodiment of the device as depicted in FIG. 11D according to the present disclosure.
Figure 11G:
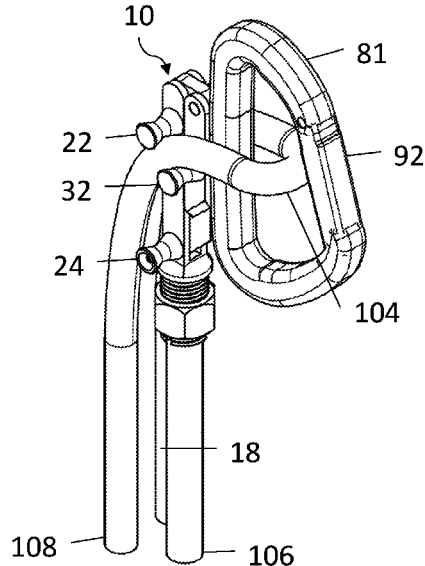
FIG. 11G depicts a perspective view of an embodiment of the device in use according to the present disclosure, where the loop of the rope has been placed within the closed carabiner so as to be interlocked against each other.
Figure 11H:
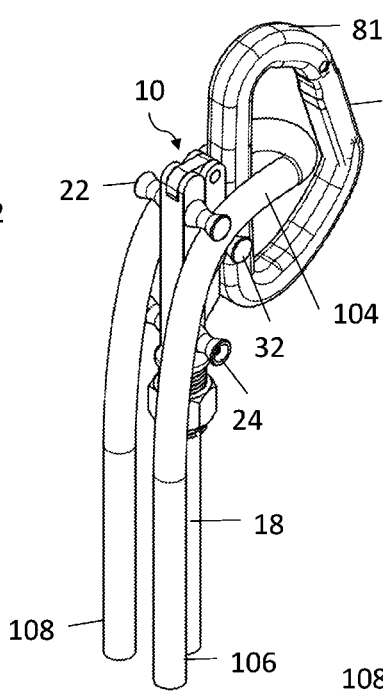
FIG. 11H depicts another perspective view of an embodiment of the device in use as depicted in FIG. 11G according to the present disclosure.
Figure 11I:
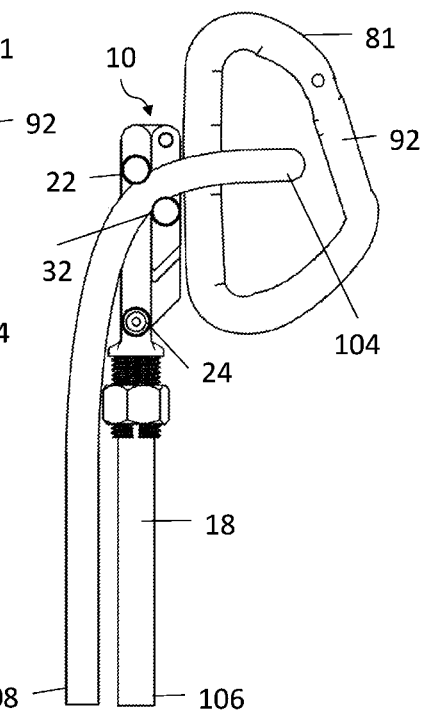
FIG. 11I depicts a side view of an embodiment of the device in use as depicted in FIG. 11G according to the present disclosure.

Upon further pulling of both ends 106, 108 of the rope 100, the rope loop urges the gate 92 of the lower carabiner 81 towards the spine 88 as depicted in FIGS. 11D to 11F. The tip 102 of the loop of the rope 100 continues to slide along the gate 92 towards the tip 94 of the gate 92. Once the tip 102 of the loop of the rope 100 passes the tip 94 of the gate 92, a biasing means, such as a spring 90 of the lower carabiner 81 retracts the gate 92 so as to "close" the gate 92 of the lower carabiner 81, thereby clipping the rope 100 loop in the lower carabiner 81 of the quickdraw 80.

Once the rope 100 loop is engaged in the lower carabiner 81 of the quickdraw 80, the device 10 can then be pulled downwards by the operator. The projecting members travel along the length of the rope 100 toward the user, until the device 10 is able to be manually disengaged by the user. In particular as described herein with reference to FIGS. 5-7 above, in the embodiment depicted the securing means may be disengaged from the corresponding recess 46, to allow the rope 100 to be removed from between the adjacent projecting members between which it is retained.

A similar disengagement process could also be followed by the user of the device in respect of the alternative securing means disclosed herein, all of which involve detaching the rope 100 from between the requisite projecting members provided.

The elongate body 20 and the jaw member 30 are disengaged to release the rope 100. As a result, the loop of the rope 100 is left resting in the basket 89 of the lower carabiner 81, ready to be attached to the climber and belayed by their climbing partner as appropriate.

In the embodiment where the engagement mechanism 40 is a hook and loop fastener as depicted in FIG. 8, the elongate body 20 and the jaw member 30 may be disengaged by the operator by removing the rope loop 104 from between the projecting members. Once the elongate body 20 and the jaw member 30 are disengaged, both parts of the rope loop 104 can be released from the device 10.

Similarly, in the embodiment where the engagement mechanism 40 is an inextensible member as depicted in FIG. 9, the elongate body 20 and the jaw member 30 may be disengaged by the operator by removal of the inextensible member, thereby releasing both parts of the rope loop 104 from the device 10.

The above embodiments are described by way of example only. Many variations are possible without departing from the scope of the disclosure as defined in the appended claims.

The device of the present application provides a convenient way for climber to attach carabiner to the bolt anchor in order to provide protection to the climber against fall. The device is reliable and mechanically robust. The device may also have a secondary function of attaching a rope loop to the carabiner of the quickdraw, so that the same device can perform multiple functions and provide various options for establishing protection, especially when the risk of fall for the climber to ascend to the hanger is high.

Unless defined otherwise, all technical terms used herein have the same meanings as commonly understood by one of ordinary skill in the art of product manufacturing technologies and climbing apparatus. Specific methods, devices, and materials are described in this application, but any methods and materials similar or equivalent to those described herein can be used in the practice of the present invention. While embodiments of the invention have been described in some detail and by way of exemplary illustrations, such illustration is for purposes of clarity of understanding only, and is not intended to be limiting. Various terms have been used in the description to convey an understanding of the invention; it will be understood that the meaning of these various terms extends to common linguistic or grammatical variations or forms thereof. Terminology that is introduced at a later date that may be reasonably understood as a derivative of a contemporary term or designating of a hierarchal subset embraced by a contemporary term will be understood as having been described by the now contemporary terminology. Moreover, any one or more features of any embodiment of the present disclosure can be combined with any one or more other features of any other embodiment of the invention, without departing from the scope of the present disclosure. Still further, it should be understood that the invention is not limited to the embodiments that have been set forth for purposes of exemplification, but is to be defined only by a fair reading of claims that are appended to the patent application, including the full range of equivalency to which each element thereof is entitled.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A device for releasably retaining a carabiner, said device comprising:
    an elongate body with a jaw member hingedly attached at a first position thereto, said jaw member being movable towards and away from the elongate body in a first plane;
    a first projecting member and a second projecting member extending outwardly from a first side of the elongate body and away from the first plane;
    a third projecting member extending outwardly from a first side of the jaw member and away from the first plane,
    wherein the first projecting member and the second projecting member are configured to receive a spine of a carabiner inserted therebetween and whereupon third projecting member is configured to urge a gate of the carabiner toward the spine of the carabiner.

2. The device of claim 1, wherein the first projecting member, the second projecting member and the third projecting member extend outwardly and parallel relative to each other.

3. The device of claim 1, wherein the first projecting member, the second projecting member and the third projecting member extend outwardly and substantially orthogonal to the first plane.

4. The device of claim 1, wherein the third projecting member is disposed on a first side of the jaw member and between the first projecting member and the second projecting member when said jaw member is adjacent a longitudinal axis of the elongate body.

5. The device of claim 1, further comprising a fourth projecting member extending outwardly and away from an opposed side to the first side of the elongate body or the first side of the jaw member.

6. The device of claim 5, wherein at least one of the first projecting member and the second projecting member on the first side of the elongate body, and the third projecting member on the first side of the jaw member, are disposed on the elongate body and jaw member respectively so as to receive a first part of a loop of a rope therebetween; and wherein the fourth projecting member on the opposed side of the elongate body or jaw member is configured to guide a second part of the loop of the rope thereon.

7. The device of claim 1, further comprising a fourth projecting member extending outwardly and away from an opposed side to the first side of the jaw member, and a fifth projecting member extending outwardly and away from an opposed side to the first side of the elongate body.

8. The device of claim 7, wherein at least one of the first projecting member and the second projecting member on the first side of the elongate body and the third projecting member on the first side of the jaw member are disposed on the elongate body and jaw member respectively so as to receive a first part of a loop of a rope therebetween; and wherein the fourth projecting member on the opposed side of the elongate body and the fifth projecting member on the opposed side of the jaw member are disposed on the elongate body and jaw member respectively so as to receive a second part of the loop of the rope therebetween.

9. The device of claim 5 or 7, wherein the jaw member is engageable with the elongate body so as to be substantially adjacent thereto.

10. The device of claim 9, wherein the jaw member is engageable with the elongate body by an engagement means being a complementary securing means, a substantially inextensible member, and fastening means.

11. The device of claim 10, wherein the engagement means is a pivotally attached hook disposed on the elongate body or jaw member engageable in a corresponding recess disposed on either of the elongate body or jaw member.

12. The device of claim 10, wherein the engagement means is a hook and loop fastener disposed on the elongate body and a third side of the jaw member.

13. The device of claim 7, further comprising a sixth projecting member extending outwardly and away from an opposed side to the first side of the elongate body.

14. The device of claim 1, wherein at least one of the first projecting member, second projecting member and third projecting member comprises a first tapered frusto-conical section attached to a second frusto-conical section, and the first frusto-conical section and the second frusto-conical section taper toward each other for guiding a rope thereabout.

15. The device of claim 1, wherein at least one of the first projecting member, second projecting member and third projecting member comprises a reinforcing element engaged therein.

16. The device of claim 15, wherein the reinforcing element is a screw member threadingly engaged therewith.

17. The device of claim 1, further comprising a base having an aperture for receiving an extension member therein.

18. The device of claim 17, wherein the extension member is secured within the aperture by a locking mechanism comprising an externally threaded portion and a corresponding nut engageable thereabout.

19. The device of claim 17, wherein the extension member is extendable or collapsible.

20. The device of claim 1, wherein at least one of the elongate body, jaw member, first projecting member, second projecting member and third projecting member is made of plastic.

21. A method of operating the device of claim 1 to secure a carabiner to a bolt anchor, the method comprising:
    inserting a spine of a carabiner between the first projecting member and the second projecting members;
    urging a gate of the carabiner toward the spine of the carabiner against the force of a biasing means for retention by the third projecting member; and
    advancing a nose of the carabiner through a void of a bolt anchor, and displacing the jaw member from retention by the third member for closure of the gate by said biasing means.

22. A method of operating the device of claim 10 to secure a rope loop within a remotely located carabiner, the method comprising:
- guiding a first part of the rope loop between at least one of the first projecting member and the second projecting member on the first side of the elongate body of the device, and the third projecting member on the first side of the jaw member of the device;
- guiding a second part of rope loop on the fourth projecting member on the opposed side of the elongate body or jaw member;
- engaging the loop of the rope in a remotely located carabiner.

23. The method of operating the device of claim 10 to secure a rope loop within a remotely located carabiner according to claim 22 wherein the method further comprises extracting the rope from between the least one of the first projecting member and the second projecting member on the first side of the elongate body of the device, and the third projecting member on the first side of the jaw member of the device.

* * * * *